Feb. 14, 1961 S. L. SEATON 2,972,046

BANDWIDTH MODULATION INFORMATION TRANSFER SYSTEM

Filed Aug. 30, 1957 3 Sheets-Sheet 1

INVENTOR

STUART L. SEATON

BY Harold T. Stowell
Harold L. Stowell

ATTORNEYS

BANDWIDTH MODULATION INFORMATION TRANSFER SYSTEM

Filed Aug. 30, 1957 3 Sheets-Sheet 2

INVENTOR
STUART L. SEATON
Harold L. Stowell
ATTORNEYS

BANDWIDTH MODULATION INFORMATION TRANSFER SYSTEM

Filed Aug. 30, 1957 3 Sheets-Sheet 3

INVENTOR
STUART L. SEATON

BY Harold T. Stowell
Harold L. Stowell

ATTORNEYS

United States Patent Office 2,972,046

Patented Feb. 14, 1961

2,972,046

BANDWIDTH MODULATION INFORMATION TRANSFER SYSTEM

Stuart L. Seaton, Clarksburg, Md., assignor to Research Corporation, New York, N.Y., a corporation of New York Filed Aug. 30, 1957, Ser. No. 681,381

6 Claims. (Cl. 250—6)

The present invention relates to the transfer of information and more particularly to a method and apparatus for transferring information from one place to another by electrical, electromagnetic, mechanical, acoustic or other forms of wave energy.

In transferring information from place to place by any of the known forms of wave energy a transfer medium is always involved which in general is imperfect and noisy; that is, the characteristics of the transfer medium are such as to add unwanted energy to, or otherwise alter the signal configuration used in the information transfer process.

It is an object of this invention to produce a method and apparatus which effectively minimizes the effect on the desired signal of the unwanted energy occurring by virtue of the transfer medium.

Another object of the invention is to produce a method of signalling such that the particular type of noise reduction may be economically achieved.

Another object of the invention is to produce an information transfer system which will reduce circuit noise and thereby increase the rate at which information can be transferred.

Typically, the invention employs the use of two band pass filters, one of which has a wider pass band than the other, although the central frequency of each is the same. Signalling is accomplished at the transmitter by sending a multi-frequency energy through one or the other of the filters in a sequence determined by the code adapted for the signalling system. The energy sent forth then is that portion of the original multi-frequency energy passed by one or the other of the band pass filters.

At the receiver, there are also two filters having central frequencies and pass bands identical with the transmitter filters. The output of the receiver filters enters a bridge circuit which is balanced so that there is no output from the bridge circuit when the transmitter filter of smaller band pass is passing energy. In this balanced condition, the receiver and its filters, bridge and associated systems have also balanced out inherent circuit and system noise, including that imposed by the transfer medium. When one and then the other of the transmitter filters passes energy from the multi-frequency source, a bridge unbalance will occur at the receiver because of the change in energy distribution caused by the transmitters action. The bridge unbalance is then detected and employed to actuate a recorder.

The objects and advantages of the invention above set forth will become manifest from reading the following description in connection with the drawings in which.

Figure 1:
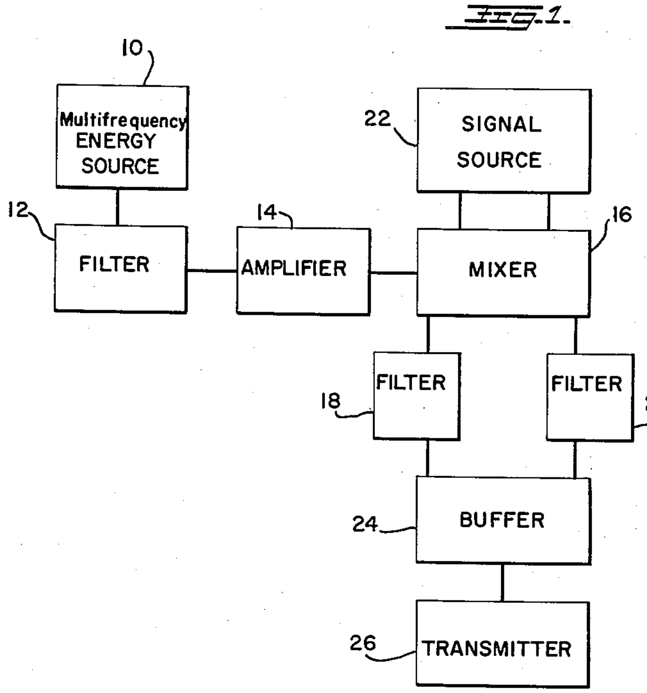
Fig. 1 is a block diagram of the energy transfer system.
Figure 1:
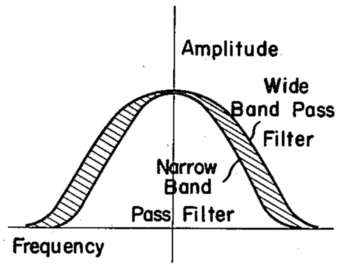

The system of Fig. 1 includes a multi-frequency noise generator 10 having a frequency spectrum equivalent to or overlapping the frequency band of the wider band pass filter of the system. The output from the multi-frequency energy source 10 is fed through a filter 12 and an amplifier 14 to a mixer 16 which in turn is connected to two band pass filters 18 and 20. A signal source 22 is electrically coupled to the mixer 16. The purpose of the signal source 22 is to direct energy from the multi-frequency energy source 10 to either filter 18 or to filter 20 in accordance with the information given by the signal source 22. A transmitter 26 is driven by energy from filter 18 or filter 20 and amplifies the driving energy and suitably converts it for moving through the transfer medium. A buffer 24 is coupled between the filter stage comprising the filters 18 and 20 and the transmitter 26 to prevent undesirable interaction between these two stages and between the filters.

The transfer medium mentioned above may be any medium coupling the transmitter circuit to the receiver, for example, gas, liquid, solid, or other medium capable of permitting energy to be propagated through or along it.

The receiver portion of the invention comprises a receiver 30 which is adapted to receive the information transmitted by the transmitter 26. Also, in addition to being sensitive to the energy emanating from the transmitter 26, the receiver 30 is sensitive to changes in energy arriving from the transfer medium. Energy received by the receiver 30 is introduced into the filter 32 having a band pass identical to the transmitter filter 18 and into a filter 34 having a band pass identical with that of the transmitter filter 20. Both of these filters have the same central frequency. In addition to the energy introduced into the filters 32 and 34 from the receiver 30, a noise generator 36 is provided to introduce energy of a wide frequency band into the filters 32 and 34. The frequencies produced by the noise generator 36 must be sufficient to completely cover the band pass of both the filters. The noise generator 36 is used for initially adjusting the receiver bridge circuit 40 and also is effective in overcoming certain types of extraneous noise. A buffer 38 is coupled between the receiver 30 and the filters 32 and 34 and operates to prevent undesirable interaction between these two stages and between the filters. The output sides of the filters 32 and 34 are connected to individual arms of a bridge circuit 40 which in turn is connected to a recorder 42 or the like. The bridge circuit 40 is balanced in operation by a balancing control so that in effect no energy passes to the recorder 42 when the transmitter 26 is sending only through the narrower of its filters. The recorder 42 is employed to record the energy changes representing information transfered.

Figure 2:
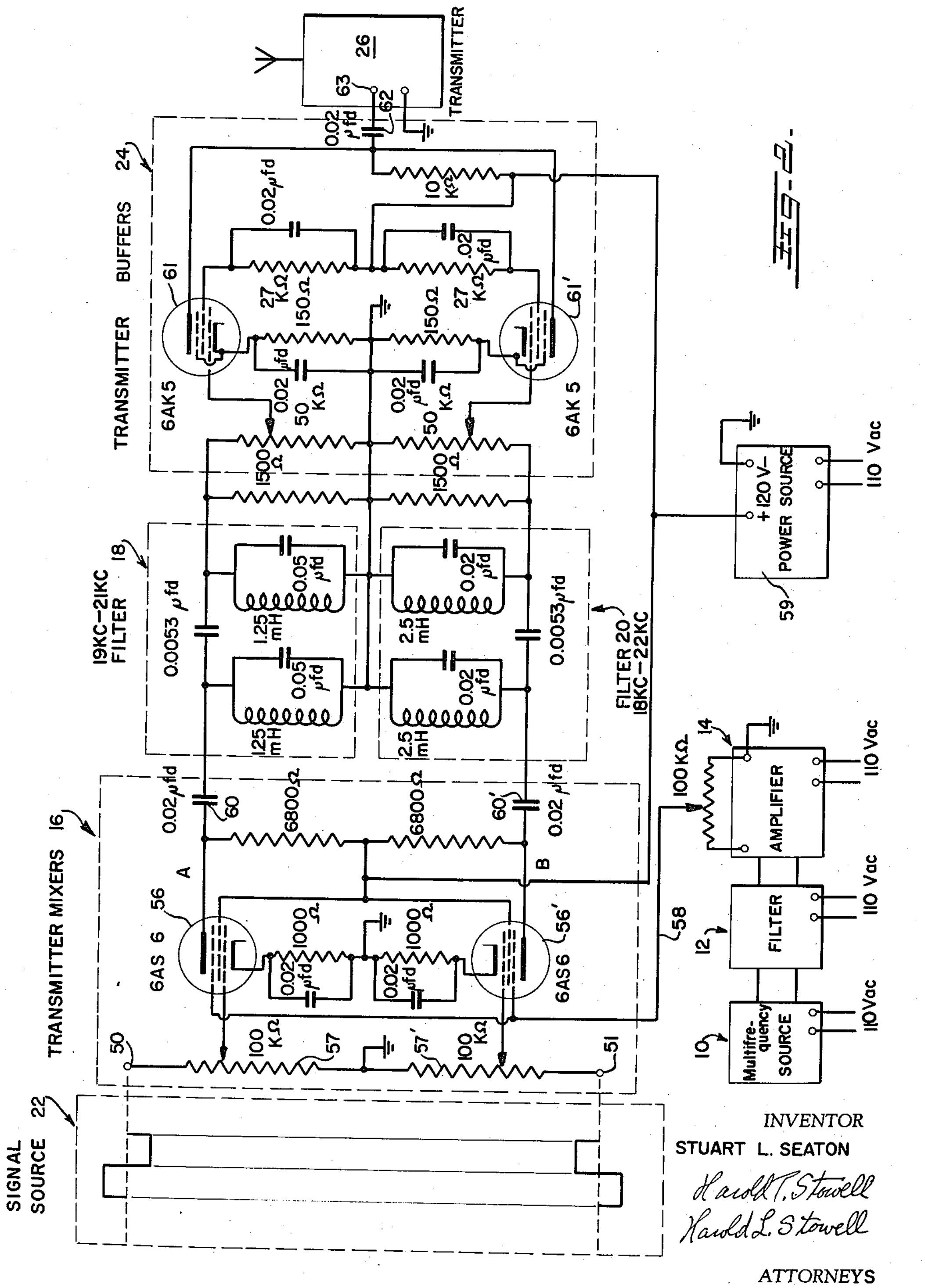
Fig. 2 is a circuit diagram of the transmitting circuits.
Figure 3:
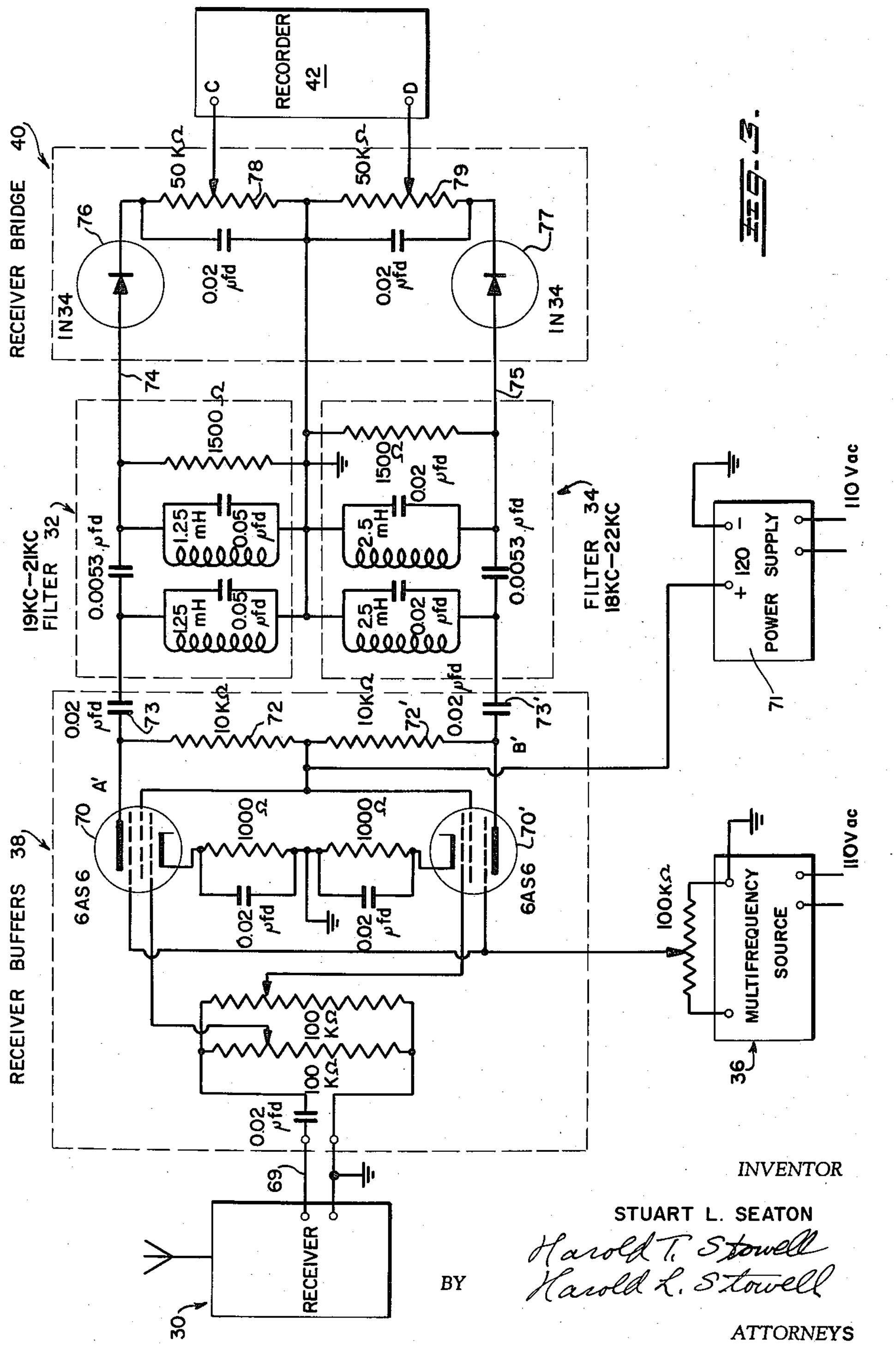
Fig. 3 is a circuit diagram of the receiver circuit.

With reference to the specific circuitry which may be employed to achieve the objectives of the invention, Figs. 2 and 3 show a system for transferring information electronically. Fig. 2 shows the transmitter circuit and Fig. 3 shows the receiver circuit.

In the transmitter circuit of Fig. 2 there are shown signal input terminals 50 and 51 of the mixer circuit 16 which are electrically coupled to the signal source 22. The mixer circuit 16, in effect contains two channels which are substantially identical with one another and for purposes of simplicity only a single one will be described in detail while the corresponding elements of the other channel are designated by prime reference numerals. The channel of the mixer 16 which is connected to the terminal 50 of the signal source 22 comprises an amplifier tube 56 which may be a sharp cut-off pentode type tube such as 6AS6 having a plate, a cathode, a control grid, a screen grid and a suppressor grid. The output of the terminal 50 is fed to the control grid of the tube 56 through a resistor 57, so that the voltage applied to the grid of tube 56 may be adjusted. A multi-frequency generator 10 which produces wide-band noise of uniform spectrum level for modulating the input signal is connected through band pass filter 12 and amplifier 14, to the suppressor grid of the tube 56 through a conductor 58. A suitable noise generator may be of the type manufactured by General Radio Company and designated as Type 1390–A which has a frequency response from approximately 30 cycles to approximately 500 kilocycles. Voltage is supplied to the plate of the tube 56 from a power supply 59.

The outputs of the mixer tubes 56 and 56′ are fed to associated band pass filters 18 and 20 respectively through blocking condensers 60 and 60′. The filter 18 has a band pass width of from 19,000 cycles to 21,000 cycles, while the filter 20 has a band pass of from 18,000 cycles to 22,000 cycles. Each of these filters has the same central frequency of 20,000 cycles. Again for the sake of continuity and ease of understanding, the energy passed through filter 18 will be referred to as being in channel A while the energy in filter 20 will be referred to as being in channel B.

The filters 18 and 20 are coupled to a buffer stage 24 which comprises separate channels for the energy being transmitted in channels A and B and is operative to prevent any undesirable interaction between the filter stage and the transmitter 26 and between the filters. The outputs of the filters 18 and 20 are fed to the control grids of buffer amplifier tubes 61 and 61′ which may be sharp cut-off pentode tubes such as 6AK5. These tubes have their plates coupled together and in turn are coupled through a blocking condenser 62 to input terminal 63 of transmitter 26. The transmitter 26 may be of the type manufactured by Collins Radio Company and designated as Model KW–1.

The information transmitted by the transmitter 26 is received by a receiver 30 and its associated circuit as illustrated in Fig. 3. The receiver 30 may typically be of the type manufactured by National Company, Inc., and designated as Model HRO–60. The receiver output is fed to a buffer stage 38 which comprises two channels, one for the energy transmitted from channel A of the transmitter circuit and one for channel B. The buffer stage of the receiver circuit is substantially identical with the corresponding stage of the transmitter circuit and specifically comprises a pair of amplifier tubes 70 and 70′ whose control grids are adapted to receive the output of the receiver 30 in addition to the energy supplied by a noise generator 36, which is the same type as that employed in the transmitter circuit illustrated in Fig. 2. The plate voltage of the buffer tubes 70 and 70′ is supplied by a power supply 71 through suitable plate resistors 72 and 72′.

The plates of the buffer tubes 70 and 70′ are individually coupled to band pass filters 32 and 34, respectively, through blocking condensers 73 and 73′. The receiver filter 32 has the same characteristics as its corresponding filter 18 of the transmitter circuit and each is employed to pass the energy of the channel A. The filter 34 corresponds to the transmitter filter 20 and is adapted to pass the energy of the channel B. These receiver filters like the transmitter filters have the same central frequency. The output sides of the receiver filters 32 and 34 are coupled to adjacent arms of the receiver bridge circuit 40 through conductors 74 and 75, respectively. The conductors 74 and 75 are connected to diodes 76 and 77 which comprise a portion of the bridge 40. These diodes may be germanium type 1N34 diodes as illustrated in Fig. 3. The other arms of the receiver bridge 40 comprise variable resistance elements 78 and 79 which may be varied to balance the bridge. The output of the bridge is sensed across the terminals C and D which may be in turn connected to the input of a recording system 42.

In operation, the keying signal is such that in the "no signal" condition, suitable energy may be passed through the conductor 57 to the control grid of the tube 56 to render the tube conductive. It will be noted in Fig. 2 there is shown a typical input signal wave form which is of square wave configuration. The first half cycle of the wave is referred to in the following description as the "no signal" and the second half cycle of the wave as the "signal." The first half cycle of the input signal is effective to impress a sufficient bias on the mixer tube 56 to render it conductive while the bias which is simultaneously impressed on the mixer tube 56′ is sufficient to render it non-conductive. When the tube 56 becomes conductive, the output of the noise generator 10 which is being fed to the suppressor grid of the tube 56 through the conductor 58 will pass to the filter 18 through the blocking condenser 60. The filter 18 in turn will pass all of the frequencies within its associated band pass which in the present case is from 19,000 to 21,000 cycles. The filter output is then fed to the transmitter 26 through the buffer tube 61 of the buffer stage 24.

The keying signal source 22 is also initially adjusted so that in the "signal" condition, the signal renders the tube 56 non-conductive, thereby blocking the passage of any energy through channel A. In this condition the tube 56′ is rendered conductive permitting the energy from the noise generator 10 to be passed to suppressor grid of the tube 56′ through the conductor 58 and hence to the filter 20 through the blocking condenser 60′. The filter 20 in turn will pass all the frequencies within its associated band pass which in the present embodiment is from 18,000 to 22,000 cycles. The energy passed by the filter 20 is passed on to the transmitter 26 through the buffer tube 61′ of the buffer stage 24 to modulate the RF carrier.

Accordingly, it will be seen that the transmitter circuit in the "no signal" condition will transmit all the frequencies passed by the filter 18 (19,000 to 21,000 cycles) to the transmitter 26 to modulate its RF carrier. In the "signal" condition, the transmitter circuit will transmit all the frequencies passed by filter 20 which are all the frequencies contained in the "no signal" condition plus those additional frequencies passed by filter 20.

In other words the keying changes the bandwidth of the system while the central frequency remains constant.

The information transmitted by the transmitter 26 in the form of electromagnetic energy is received by the receiver 30, which is tuned to the transmitter's carrier. Although, the illustrated embodiment of the invention shows a conventional radio transmitter and receiver, the system could likewise satisfactorily employ a line or cable interconnecting the transmitter and receiver. The output from the receiver 30 is fed to the receiver buffer stage 38 through a conductor 69. This energy is divided by the buffer tubes 70 and 70′ and in turn is fed to the filters 32 and 34.

In the "no signal" condition, the buffer tubes 70 and 70′ receive the energy from the transmitter filter 18 plus the circuit noise and the noise injected into the receiver circuit by the receiver noise generator 36. The combined energy is passed on to the filters 32 and 34. The buffer tubes 70 and 70′ are so adjusted that an equal amount of energy is passed by each of the tubes. In this condition, both the filters 32 and 34 pass the signal energy received from the transmitter plus the noise, but the output from filter 32 is less than the output of filter 34 because the band pass of the latter is greater than the former. In this condition, that is, the "no signal" condition, the receiver bridge 40 is adjusted through the variable resistors 78 and 79 to a balanced state so that no signal is sensed by the recorder 42 across the bridge terminals C and D.

When the transmitter mixer 16 receives a "signal," the mixer tube 56 becomes non-conductive and tube 56′ becomes conductive permitting the energy to flow through filter 20 of channel B. The receiver passes no more energy than before through filter 32 but the filter 34 does pass more energy because it now has additional frequencies within its band pass. This causes an unbalance of the receiver bridge 40 because more energy is arriving through filter 34 than through filter 32 and the unbalance of the bridge is sensed across terminals C and D by the recorder 42.

Figure 4:
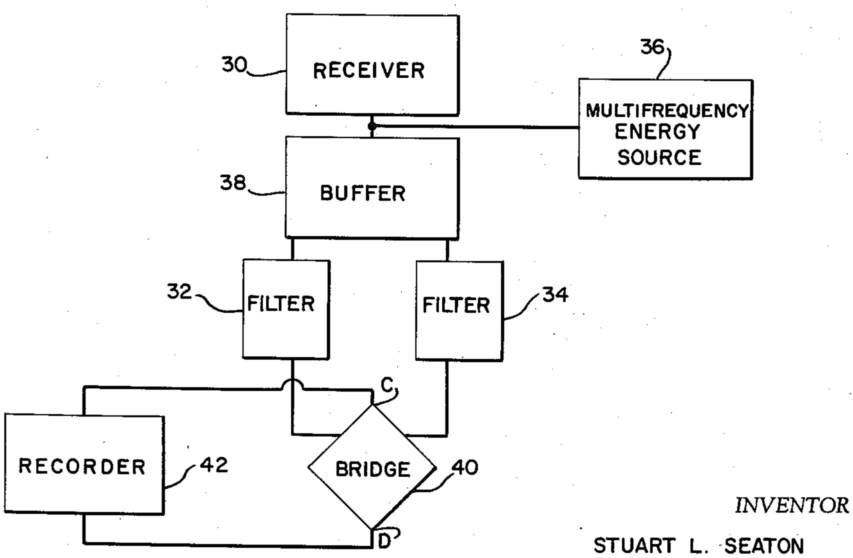
Fig. 4 is a diagrammatic illustration of the frequency response of the filters of the system wherein the information transmitted resides in the bandwidth modulation between the two response curves.

Accordingly, it will be seen from an examination of Fig. 4 that information transmitted by the system resides in the bandwidth modulation or as illustrated in the shaded area between the response curves of the narrow band pass filter and the wide band pass filter. It will be appreciated that variable filters could be satisfactorily employed in the system without avoiding the spirit of the invention. Specifically, the objectives of the invention could be achieved by modifying the transmitter circuit shown in Fig. 2 and substituting a single variable filter in place of the two fixed filters 18 and 20. In such an arrangement means would be provided for effecting a variation in the band pass of the variable filter in accordance with the input signal.

I claim:

1. An energy transfer system comprising a multi-frequency energy source, a transmitter, a first and a second transmitter filter means connected between said source and said transmitter, said first filter means having a narrower pass band than said second filter means and each having the same central frequency, means for selectively connecting said multi-frequency source to said transmitter through the first and second filter means, a receiver, a bridge circuit, a first and a second receiver filter means connected between said receiver and said bridge, said first and second receiver filter means having the same characteristics as said transmitter filter means, and means for sensing the output of said bridge.

2. A bandwidth modulation energy transfer system comprising a multi-frequency energy source, a transmitter, a first filter means connected between said source and said transmitter, a second filter means connected between said source and said transmitter, said second filter means having a wider band pass than said first filter means, means for selectively permitting passage of energy from said source to said filter means, a receiver, a bridge circuit, a filter means connected between said receiver and said bridge, said filter means including at least two filters and having the same band pass characteristics as said first and said second filter means, and means for sensing an unbalance of said bridge in response to the energy passed by said filter means.

3. An energy transfer system comprising a multi-frequency energy source, a transmitter, a first and a second transmitter filter means connected between said source and said transmitter, said first filter means having a narrower pass band than said second filter means and each having the same central frequency, means for selectively connecting said multi-frequency source to said transmitter through the first and second filter means, a receiver, a first and a second receiver filter means connected to said receiver and having the same characteristics as said transmitter filter means, and means for sensing a difference in energy passed by said first and second receiver filter means.

4. An energy transfer system comprising a multi-frequency energy source, a transmitter, a variable filter means connected between said source and said transmitter, said variable filter means being operative to vary its band pass characteristics between two bandwidths wherein one of the bandwidths is wider than the other and both have the same central frequency, means for alternately effecting the passage of frequencies within one or the other of said bandwidths to said transmitter, a receiver, a first and a second receiver filter means connected to said receiver, said first filter means having a band pass corresponding to the narrower bandwidth of said variable filter, said second filter means having a band pass corresponding to the wider bandwidth of said variable filter, and means for sensing a variation in the frequencies passed by sad first and second filter means.

5. An energy transfer system comprising a multi-frequency energy source, a transmitter, means connected between said source and said transmitter for varying the bandwidth of frequencies passed from said source to said transmitter, said means including at least two filter means having different pass band characteristics and each having a common central frequency, and a receiver tunable to said transmitter and including means for sensing variations in the bandwidth of frequencies received thereby.

6. An energy transfer system comprising a multi-frequency energy source, a transmitter, means connected between said source and said transmitter for varying the bandwidth of frequencies passed from said source to said transmitter, a receiver including a first and a second filter means, said first filter means having a narrower band pass than said second filter means and each having the same central frequency, and means for sensing a variation in the frequencies passed by said first and second filter means.

References Cited in the file of this patent

UNITED STATES PATENTS

| | | |
|---|---|---|
| 2,198,248 | Hansell | Apr. 23, 1940 |
| 2,215,284 | Armstrong | Sept. 17, 1940 |
| 2,272,999 | Curtis | Feb. 10, 1942 |